United States Patent
Wu

(10) Patent No.: US 11,687,260 B2
(45) Date of Patent: Jun. 27, 2023

(54) PRE-SHUTDOWN MEDIA MANAGEMENT OPERATION FOR VEHICLE MEMORY SUB-SYSTEM

(71) Applicant: Micron Technology, Inc., Boise, ID (US)

(72) Inventor: Minjian Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 14 days.

(21) Appl. No.: 17/540,526

(22) Filed: Dec. 2, 2021

(65) Prior Publication Data
US 2023/0048514 A1    Feb. 16, 2023

Related U.S. Application Data

(60) Provisional application No. 63/231,625, filed on Aug. 10, 2021.

(51) Int. Cl.
G06F 3/06    (2006.01)

(52) U.S. Cl.
CPC ............ G06F 3/0634 (2013.01); G06F 3/064 (2013.01); G06F 3/0619 (2013.01); G06F 3/0625 (2013.01); G06F 3/0659 (2013.01); G06F 3/0673 (2013.01)

(58) Field of Classification Search
CPC .... G06F 3/0634; G06F 3/0619; G06F 3/0625; G06F 3/064; G06F 3/0659; G06F 3/0673
See application file for complete search history.

(56) References Cited

U.S. PATENT DOCUMENTS

| 9,008,898 | B2 * | 4/2015 | Umesaka | G07C 5/0816 |
| | | | | 701/33.2 |
| 9,984,757 | B2 | 5/2018 | Lee et al. | |
| 10,725,706 | B1 | 7/2020 | Boenapalli et al. | |
| 2005/0190656 | A1 * | 9/2005 | Noguchi | G07C 5/085 |
| | | | | 369/7 |
| 2018/0088959 | A1 * | 3/2018 | Bailey | G06F 9/4418 |
| 2019/0034336 | A1 * | 1/2019 | Slindee | G06F 3/0688 |
| 2021/0192867 | A1 * | 6/2021 | Fang | G07C 5/008 |
| 2021/0345093 | A1 * | 11/2021 | Devaraj | H04W 8/22 |

OTHER PUBLICATIONS

Garage Mode, Android Open Source Project, May 6, 2021, https://source.android.com/devices/automotive/power/garage_mode, 3 pages.
Jedec Solid State Technology Association, Universal Flash Storage (UFS), Version 2.1, Mar. 2016, 382 pages.

* cited by examiner

*Primary Examiner* — Edward J Dudek, Jr.
(74) *Attorney, Agent, or Firm* — Brooks, Cameron & Huebsch, PLLC

(57) ABSTRACT

A vehicle memory sub-system can be switched from a normal mode to a pre-shutdown mode and initiate a media management operation before shutting down. The mode switch and/or media management operation can be performed in response to receiving a shutdown or pre-shutdown command for the vehicle. After completion of the memory management operation the vehicle and/or memory sub-system can be shutdown.

21 Claims, 5 Drawing Sheets

PRE-SHUTDOWN MEDIA MANAGEMENT OPERATION FOR VEHICLE MEMORY SUB-SYSTEM

CROSS-REFERENCE TO RELATED APPLICATIONS

This application claims priority to U.S. Provisional Application 63/231,625, filed Aug. 10, 2021, which is incorporated by reference.

TECHNICAL FIELD

Embodiments of the disclosure relate generally to memory sub-systems, and more specifically, relate to a pre-shutdown media management operation for a vehicle memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Vehicles are becoming more dependent upon memory sub-systems to provide storage for components that were previously mechanical, independent, or non-existent. A vehicle can include a computing system, which can be a host for a memory sub-system. The computing system can run applications that provide component functionality. The vehicle may be driver operated, driver-less (autonomous), and/or partially autonomous. The memory device can be used heavily by the computing system in a vehicle.

BRIEF DESCRIPTION OF THE DRAWINGS

The present disclosure will be understood more fully from the detailed description given below and from the accompanying drawings of various embodiments of the disclosure.

FIG. 3A is a block diagram of a mobile memory sub-system usage model according to some previous approaches.

FIG. 3B is a block diagram of a vehicle memory sub-system usage model in accordance with some embodiments of the present disclosure.

DETAILED DESCRIPTION

Figure 1:
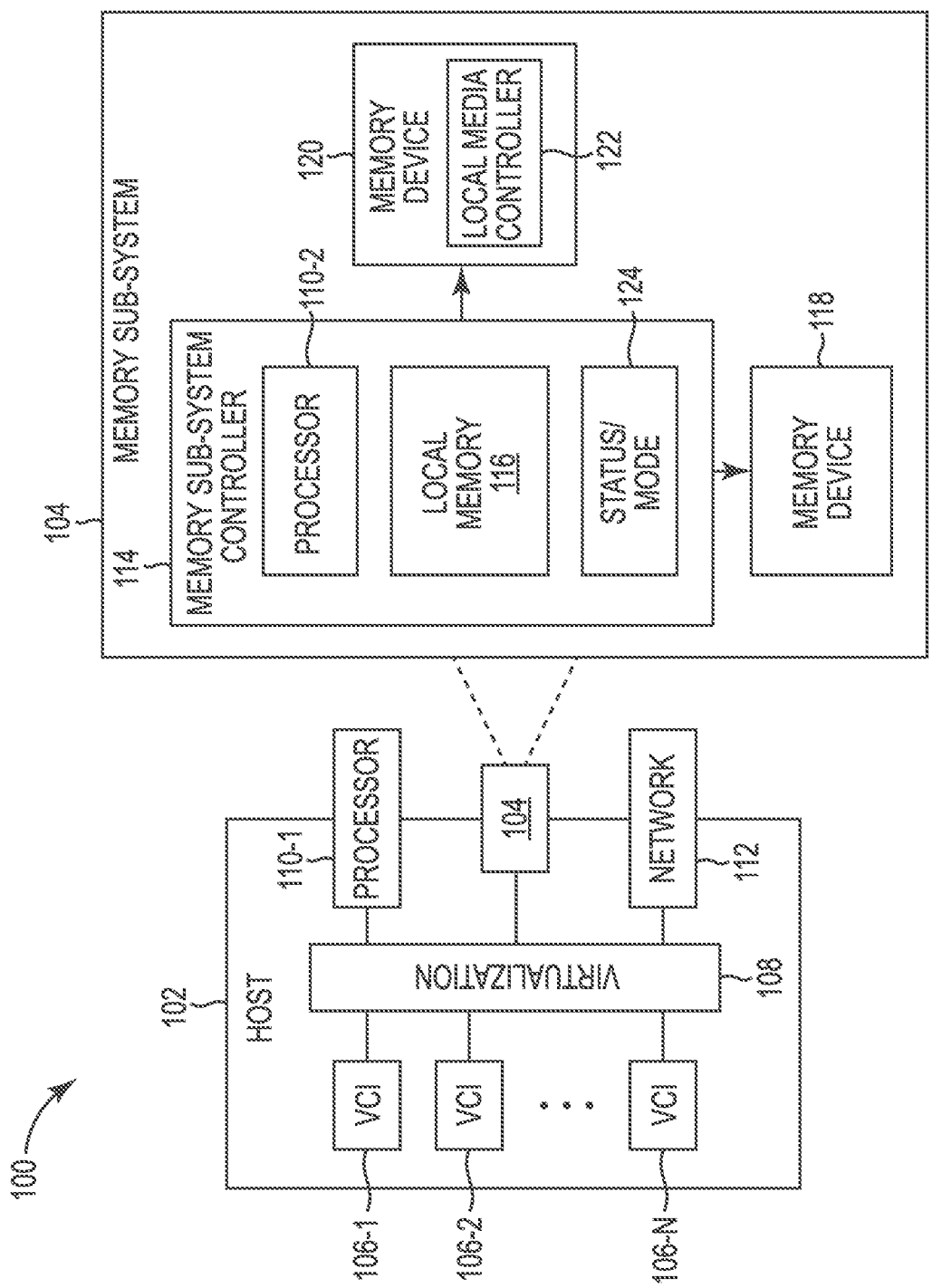
FIG. 1 is a block diagram of an example computing system that includes a memory sub-system in accordance with some embodiments of the present disclosure.

Aspects of the present disclosure are directed to pre-shutdown media management operation for a vehicle memory sub-system. A vehicle can include a memory sub-system, such as a solid state drive (SSD). The memory sub-system can be used for storage of data by applications that are run by a host system of the vehicle. Examples of such an application include a black box of the vehicle, a telemetry system of the vehicle, and an infotainment system of the vehicle. The memory sub-systems used to store the data associated with such applications in vehicles (e.g., managed NAND, eMMC, UFS, etc.) may be derived from memory systems used in mobile devices such as mobile phones, laptops, tablets, etc. However, there are significant differences in the usage patterns of memory sub-systems associated mobile devices and vehicles. For example, vehicles may be subjected to a wider temperature range than mobile devices, which requires better cross-temperature features for the memory sub-system. Also, the memory sub-systems associated with vehicles may be expected to have a longer lifetime (e.g., 10 years instead of three years), which produces an increased expectancy for endurance and retention. Furthermore, vehicle systems are becoming more complex, such as by using virtualization technology to integrate vehicle applications into a single system, producing an expectation for higher performance and lower access latency for the memory sub-system. Most mobile systems are always (or almost always) on with frequent idle time (e.g., when the user doesn't touch the screen) allowing the memory sub-system to perform internal management operations. In contrast, vehicles are frequently powered off and while on, are rarely in an idle status.

Aspects of the present disclosure address the above and other deficiencies by providing a memory sub-system for vehicles that can perform pre-shutdown media management operations. When the vehicle is to be powered off, it (or at least the memory sub-system) can receive a shutdown or pre-shutdown command and enter a pre-shutdown mode in order to perform media management operations without being interrupted by memory access requests (e.g., read, write, erase operations, etc.). After the media management operation is finished, the memory sub-system can inform the host that it is ready to be shutdown, which can allow the vehicle as a whole to finalize the shutdown process. This allows the memory sub-system to improve its performance and reliability without interrupting important functionality provided by the memory sub-system while the vehicle is on.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. Analogous elements within a Figure may be referenced with a hyphen and extra numeral or letter. Such analogous elements may be generally referenced without the hyphen and extra numeral or letter. For example, elements 106-1, 106-2, . . . , 106-N in FIG. 1 may be collectively referenced as 106. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an example computing system 100 that includes a memory sub-system 104 in accordance with some embodiments of the present disclosure. The memory sub-system 104 can include media, such as one or more volatile memory devices 118, one or more non-volatile memory devices 120, or a combination thereof. The volatile memory devices 118 can be, but are not limited to, random access memory (RAM), such as dynamic random access memory (DRAM), synchronous dynamic random access memory (SDRAM), and resistive DRAM (RDRAM).

A memory sub-system 104 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). In at least one embodiment, the memory sub-system 104 is an automotive grade SSD. Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 includes a host system 102 that is coupled to one or more memory sub-systems 104. In some embodiments, the host system 102 is coupled to different types of memory sub-systems 104. FIG. 1 illustrates an example of a host system 102 coupled to one memory sub-system 104. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 includes or is coupled to processing resources, memory resources, and network resources. As used herein, "resources" are physical or virtual components that have a finite availability within a computing system 100. For example, the processing resources include a processing device 110-1 (or a number of processing devices), the memory resources include memory sub-system 104 for secondary storage and main memory devices (not specifically illustrated) for primary storage, and the network resources include as a network interface 112. The processing device 110-1 can be one or more processor chipsets, which can execute a software stack. The processing device 110-1 can include one or more cores, one or more caches, a memory controller (e.g., NVDIMM controller), and a storage protocol controller (e.g., PCIe controller, SATA controller, etc.). The host system 102 uses the memory sub-system 104, for example, to write data to the memory sub-system 104 and read data from the memory sub-system 104.

The host system 102 can be configured to provide virtualized or non-virtualized access to the memory sub-system 104 and/or the processing resources and network resources. Virtualization can include abstraction, pooling, and automation of the processing, memory, and/or network resources. FIG. 1 generally illustrates the host system 102 providing virtualized access.

To provide such virtualization, the host system 102 incorporates a virtualization layer 108 (e.g., hypervisor, virtual machine monitor, etc.) that can execute a number of virtual computing instances (VCIs) 106-1, 106-2, . . . , 106-N. The virtualization layer 108 can provision the VCIs 106 with processing resources and memory resources and can facilitate communication for the VCIs 106 via the network interface 112. The virtualization layer 108 represents an executed instance of software run by the host system 102. The term "virtual computing instance" covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated application instances may also be referred to as VCIs. The term "VCI" covers these examples and combinations of different types of VCIs, among others.

VMs, in some embodiments, operate with their own guest operating systems on the host system 102 using the resources of the host virtualized by the virtualization layer 108. The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

The VCIs 106 can therefore represent applications that run on the virtualization layer 108 or on an operating system executed by the host system 102. By way of example, the first VCI 106-1 is an application that provides an instrument cluster for a vehicle, the second VCI 106-2 is an application that provides a black box for the vehicle, and the third VCI 106-N is an application that provides an infotainment system for the vehicle. Embodiments are not limited to these specific examples of applications.

The host system 102 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 104. The host system 102 can further utilize an NVM Express (NVMe) interface to access the non-volatile memory devices 120 when the memory sub-system 104 is coupled with the host system 102 by the PCIe interface. The physical host interface can provide an interface for passing control, address, data, and other signals between the memory sub-system 104 and the host system 102. FIG. 1 illustrates a memory sub-system 104 as an example. In general, the host system 102 can access multiple memory sub-systems via a same communication connection, multiple separate communication connections, and/or a combination of communication connections.

The host system 102 can send requests to the memory sub-system 104, for example, to store data in the memory sub-system 104 or to read data from the memory sub-system 104. The data to be written or read, as specified by a host request, is referred to as "host data." A host request can include logical address information. The logical address information can be a logical block address (LBA), which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 120 include not-and (NAND) type flash memory. NAND type flash memory includes, for example, two-dimensional NAND (2D NAND) and three-dimensional NAND (3D NAND). The non-volatile memory devices 120 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 120 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 120 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 120 can be grouped as pages that can refer to a logical unit of the memory device used to store data. With some types of memory (e.g., NAND), pages can be grouped to form blocks.

The memory sub-system controller 114 (or controller 114 for simplicity) can communicate with the non-volatile memory devices 120 to perform operations such as reading data, writing data, erasing data, and other such operations at the non-volatile memory devices 120. The memory sub-system controller 114 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 114 can be a microcontroller, special purpose logic circuitry (e.g., a field programmable gate array (FPGA), an application specific integrated circuit (ASIC), etc.), or other suitable circuitry.

The memory sub-system controller 114 can include a processing device 110-2 (e.g., a processor) configured to execute instructions stored in local memory 116. In the illustrated example, the local memory 116 of the memory sub-system controller 114 is an embedded memory configured to store instructions for performing various processes, operations, logic flows, and routines that control operation of the memory sub-system 104, including handling communications between the memory sub-system 104 and the host system 102.

In some embodiments, the local memory 116 can include memory registers storing memory pointers, fetched data, etc. The local memory 116 can also include ROM for storing micro-code, for example. While the example memory sub-system 104 in FIG. 1 has been illustrated as including the memory sub-system controller 114, in another embodiment of the present disclosure, a memory sub-system 104 does not include a memory sub-system controller 114, and can instead rely upon external control (e.g., provided by an external host, or by a processor or controller separate from the memory sub-system 104).

In general, the memory sub-system controller 114 can receive information or operations from the host system 102 and can convert the information or operations into instructions or appropriate information to achieve the desired access to the non-volatile memory devices 120 and/or the volatile memory devices 118. The memory sub-system controller 114 can be responsible for other operations such as media management operations (e.g., wear leveling operations, garbage collection operations, defragmentation operations, read refresh operations, etc.), error detection and/or correction operations, encryption operations, caching operations, and address translations between a logical address (e.g., logical block address) and a physical address (e.g., physical block address) associated with the non-volatile memory devices 120. The memory sub-system controller 114 can further include host interface circuitry to communicate with the host system 102 via the physical host interface. The host interface circuitry can convert a query received from the host system 102 into a command to access the non-volatile memory devices 120 and/or the volatile memory devices 118 as well as convert responses associated with the non-volatile memory devices 120 and/or the volatile memory devices 118 into information for the host system 102.

In some embodiments, the non-volatile memory devices 120 include a local media controller 122 that operates in conjunction with memory sub-system controller 114 to execute operations on one or more memory cells of the memory devices 120. An external controller (e.g., memory sub-system controller 114) can externally manage the non-volatile memory device 120 (e.g., perform media management operations on the memory device 120). In some embodiments, a memory device 120 is a managed memory device, which is a raw memory device combined with a local controller (e.g., local controller 122) for media management within the same memory device package. An example of a managed memory device is a managed NAND device.

In at least one embodiment, the block labeled "status/mode" 124 represents a status and/or mode register 124. In some embodiments, the status/mode circuitry 124 can comprise an ASIC configured to perform the examples described herein. The status/mode circuitry 124 can be readable via the host interface. In some embodiments, a local media controller 122 of the non-volatile memory devices 120 includes at least a portion of the status/mode circuitry 124. The local media controller 122 can include a processor (e.g., processing device) configured to execute instructions stored on the volatile memory devices 118 for performing the operations described herein. In some embodiments, the status/mode circuitry 124 is part of the host system 102, an application, or an operating system. In at least one embodiment, the block labeled "status/modes" 124 represents data or instructions stored in the memory sub-system 104. The functionality described with respect to the status/mode circuitry 124 can be embodied in machine-readable and executable instructions stored in a tangible machine-readable medium.

The memory sub-system 104 can send an optimization command to the non-volatile memory devices 120 to start a media management operation. The memory sub-system 104 can send an exit optimization command to the non-volatile memory devices 120 to stop the media management operation. The status/mode circuitry 124 can store a value indicating whether the memory sub-system 104 is in a normal mode, an optimizing mode (e.g., pre-shutdown mode), or an optimization complete mode (e.g., shutdown mode).

The memory sub-system 104 can receive a shutdown command or a pre-shutdown command from the host 102. In response, the memory sub-system 104 can change the status register 124 from a first status (e.g., normal mode) to a second status (e.g., pre-shutdown or media management operation pending). The status register can be changed by changing a value stored therein. The memory sub-system 104 can initiate a media management operation for the non-volatile memory device 120 in response to the shutdown or pre-shutdown command. Examples of the media management operation include a volume read refresh operation, a defragmentation operation, and a static wear leveling operation. While in the normal mode, the memory sub-system 104 can be configured to perform a block read refresh operation, a defragmentation operation only in response to less than a threshold ratio of free blocks being available, and/or a dynamic wear leveling operation. Various media management operations are described in more detail with respect to FIG. 4.

The memory sub-system 104 can change the status register 124 to a third status (e.g., shutdown or media management operation complete) in response to completion of the media management operation by the non-volatile memory device 120. The memory sub-system 104 can receive a startup or restart command from the host 102 and interrupt the media management operation in response to the status register 124 having the second status when the startup or restart command is received. In some embodiments, the memory sub-system 104 can be configured to provide the status of the status register 124 to the host. For example, the memory sub-system 104 can provide an indication of the third status via the host interface in response to the status register 124 being changed from the second status to the third status. In some embodiments, the host 102 can be configured to query the memory sub-system 104 for the status of the status register 124. For example, the status register 124 can be readable by the host 102.

The memory sub-system 104 can also include additional circuitry or components that are not illustrated. In some embodiments, the memory sub-system 104 can include a cache or buffer (e.g., DRAM) and address circuitry (e.g., a row decoder and a column decoder) that can receive an address from the memory sub-system controller 114 and decode the address to access the non-volatile memory devices 120.

Figure 2:
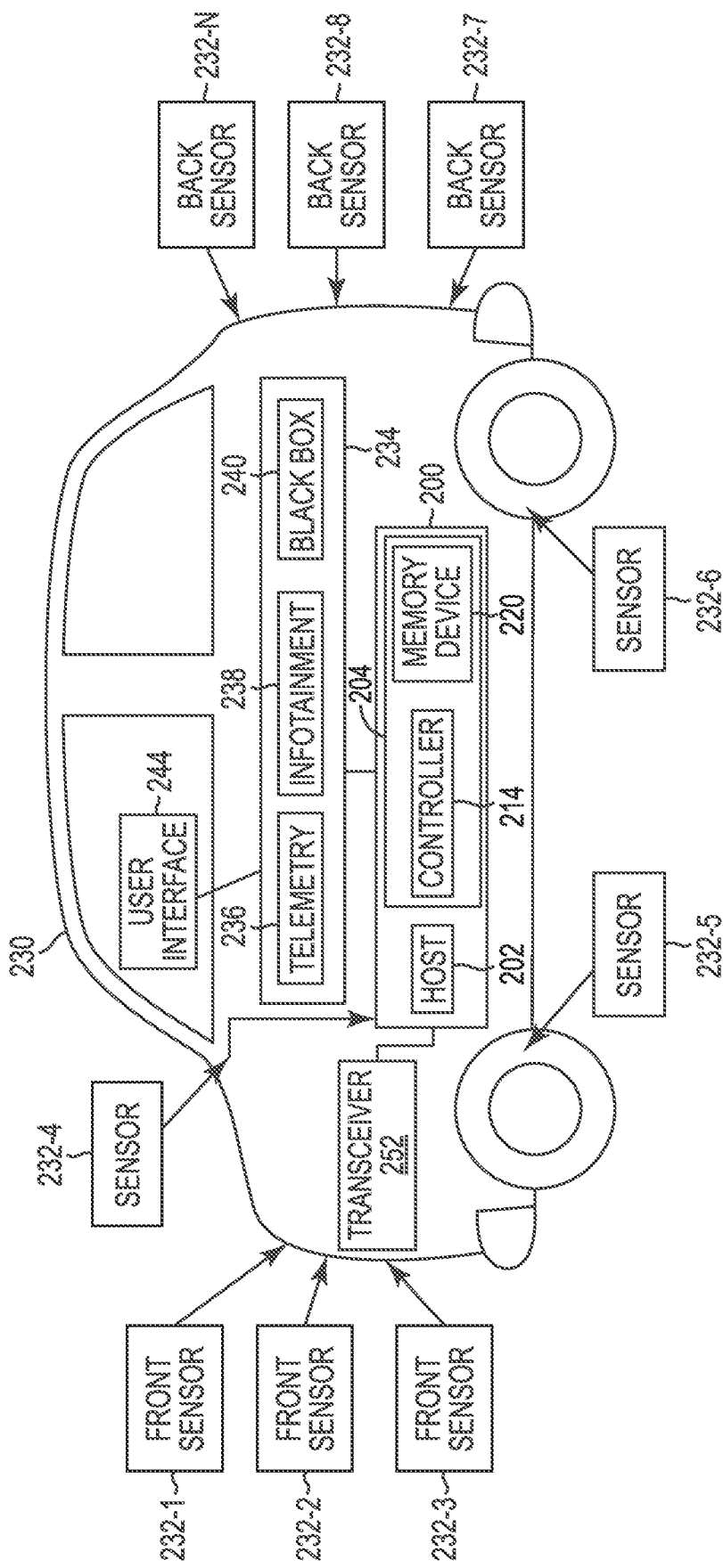
FIG. 2 illustrates an example of a system including a computing system in a vehicle in accordance with some embodiments of the present disclosure.

FIG. 2 illustrates an example of a system including a computing system 200 in a vehicle 230 in accordance with some embodiments of the present disclosure. The computing system 200 can include a memory sub-system 204, which is illustrated as including a controller 214 and non-volatile memory device 220 for simplicity but is analogous to the memory sub-system 104 illustrated in FIG. 1. The computing system 200, and thus the host 202, can be coupled to a number of sensors 232 either directly, as illustrated for the sensor 232-4 or via a transceiver 252 as illustrated for the sensors 232-1, 232-2, 232-3, 232-5, 232-6, 232-7, 232-8, . . . , 232-N. The transceiver 252 is able to receive data from the sensors 232 wirelessly, such as by radio frequency communication. In at least one embodiment, each of the sensors 232 can communicate with the computing system 200 wirelessly via the transceiver 252. In at least one embodiment, each of the sensors 232 is connected directly to the computing system 200 (e.g., via wires or optical cables).

The vehicle 230 can be a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, a ship, and/or anything used for transporting people and/or goods. The sensors 232 are illustrated in FIG. 2 as including example attributes. For example, sensors 232-1, 232-2, and 232-3 are cameras collecting data from the front of the vehicle 230. Sensors 232-4, 232-5, and 232-6 are microphone sensors collecting data from the from the front, middle, and back of the vehicle 230. The sensors 232-7, 232-8, and 232-N are cameras collecting data from the back of the vehicle 230. As another example, the sensors 232-5, 232-6 are tire pressure sensors. As another example, the sensor 232-4 is a navigation sensor, such as a global positioning system (GPS) receiver. As another example, the sensor 232-6 is a speedometer. As another example, the sensor 232-4 represents a number of engine sensors such as a temperature sensor, a pressure sensor, a voltmeter, an ammeter, a tachometer, a fuel gauge, etc. As another example, the sensor 232-4 represents a camera. Video data can be received from any of the sensors 232 associated with the vehicle 230 comprising cameras. In at least one embodiment, the video data can be compressed by the host 202 before providing the video data to the memory sub-system 204.

The host 202 can execute instructions to provide an overall control system and/or operating system for the vehicle 230. The host 202 can be a controller designed to assist in automation endeavors of the vehicle 230. For example, the host 202 can be an advanced driver assistance system controller (ADAS). An ADAS can monitor data to prevent accidents and provide warning of potentially unsafe situations. For example, the ADAS can monitor sensors in the vehicle 230 and take control of vehicle 230 operations to avoid accident or injury (e.g., to avoid accidents in the case of an incapacitated user of a vehicle). The host 202 may need to act and make decisions quickly to avoid accidents. The memory sub-system 204 can store reference data in the non-volatile memory device 220 such that data from the sensors 232 can be compared to the reference data by the host 202 in order to make quick decisions.

The host 202 can write data received from one or more sensors 232 and store the data (e.g., in association with a black box application 240 for the vehicle). The black box application 240 may also be referred to as an accident data recorder. With the advent of autonomous vehicles, some autonomous driving requires real time buffering of telemetric data such as video cameras, RADAR, LIDAR, ultrasonic and other sensors necessary to playback the sequences preceding an accident. Such data yields a considerable quantity of data per unit time for sequential write throughput from the host 202. Upon an event, a quantity (e.g., thirty seconds) of playback time immediately preceding an event needs to be captured to determine the cause of an incident. A playback may be referred to as a "snapshot". The application that controls storage of such information is referred to herein as a black box. A black box may need to store at least a few, most recent snapshots.

The host 202 can execute instructions to provide a set of applications 234 for the vehicle 230 including telemetry 236, infotainment 238, and a black box 240. The telemetry application 236 can provide information displayable on a user interface 244 such as may be associated with the instrumentation and/or dashboard of a vehicle 230. An example of such telemetric information is the speed at which the vehicle 230 is traveling (e.g., based at least in part on data from a sensor 232). The infotainment application 238 can include information and/or entertainment for a user of the vehicle 230 displayable or interfaced via the user interface 244. Examples of such information and/or entertainment include music, movies, GPS information such as a moving map, etc. The memory sub-system 204 can provide storage for any of the set of applications 234. The set of applications 234 can be virtualized, as described with respect to FIG. 1, with backing storage provided by the memory sub-system 204.

The host 202 can send a shutdown or pre-shutdown command to the memory sub-system 204, in response to which the memory sub-system 204 can initiate a media management operation. The media management operation can be exited or aborted in response to receiving a restart or startup command from the host 202 for the vehicle 230 prior to completion of the media management operation. The memory sub-system 204 can provide a shutdown ready notification to the host 102 in response to completion of the media management operation. Examples of the media management operation include a volume read refresh operation, a defragmentation operation, and a static wear leveling operation. In some embodiments, the media management operations may be initiated by the memory sub-system only in response to receiving a shutdown or pre-shutdown command. In such embodiments, different media management operations, such as a block read refresh operation, a defragmentation operation in response to less than a threshold ratio of free blocks being available, or a dynamic wear leveling operation, can be initiated after receiving a startup command from the host 202 and before receiving the shutdown or pre-shutdown command.

Figures 3A, 3B:
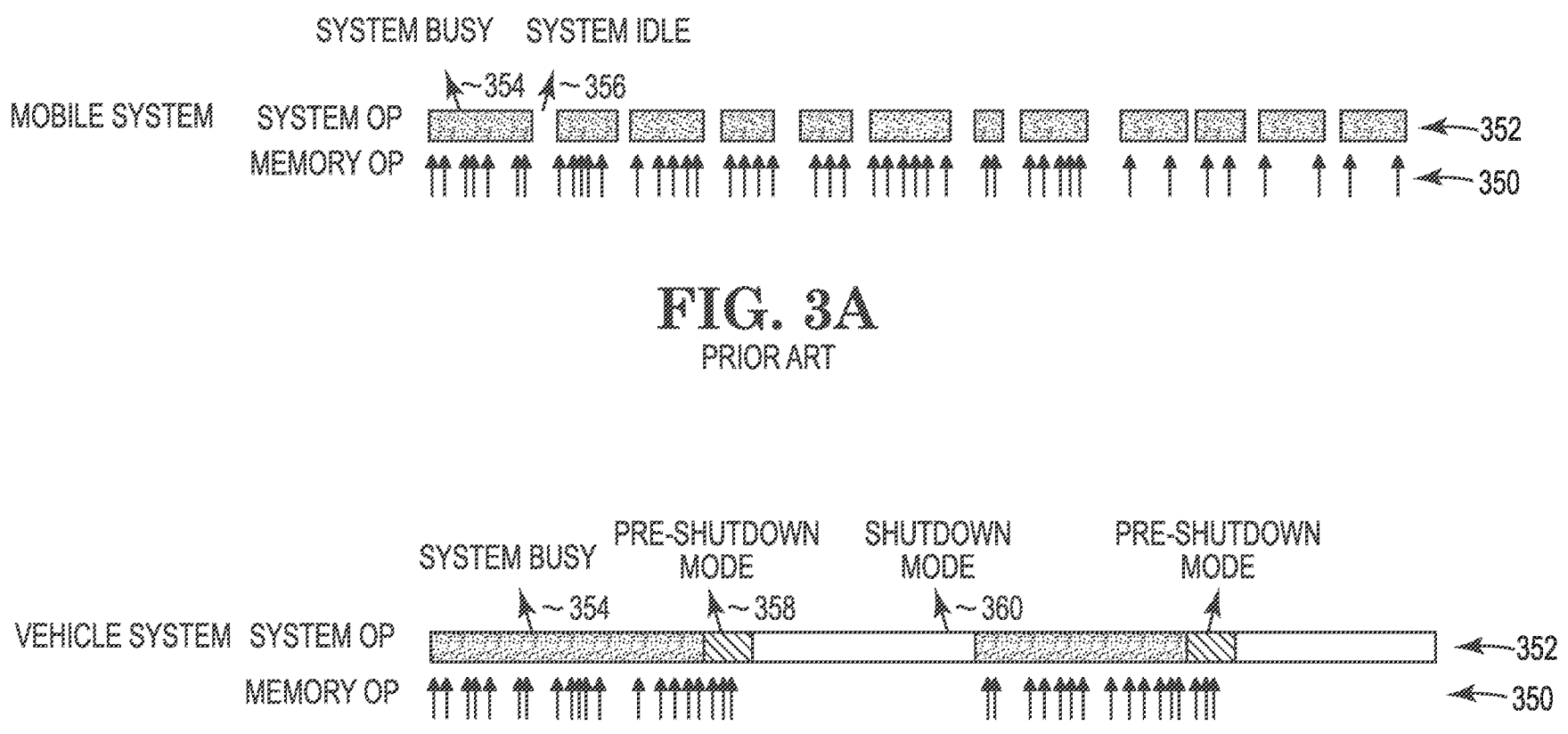

FIG. 3A is a block diagram of a mobile memory sub-system usage model according to some previous approaches. The top row 352 illustrates system operations as busy time 354 and idle time 356 with the shaded regions representing the busy time 354 and the unshaded regions representing the idle time 356. The horizontal axis generally represents the passage of time. The bottom row 350 represents individual memory operations (e.g., accesses such as reads and writes) as indicated by the arrows. Note that the arrows are aligned with the busy time 354 and not with the idle time 356.

For a mobile system, when the user does not interact with the device, it is relatively easy for the device and/or the memory sub-system providing storage for the mobile device to go into an idle mode. Although not specifically illustrated in FIG. 3A, the memory sub-system can perform media management operations during the idle time 356 so as not to affect performance of the memory sub-system during the busy time 354.

FIG. 3B is a block diagram of a vehicle memory sub-system usage model in accordance with some embodiments of the present disclosure. The top row 352 illustrates system operations as busy time 354 represented by the shaded regions, pre-shutdown mode represented by the cross-hatched regions 358, and shutdown mode represented by the unshaded regions 360. With respect to the vehicle memory sub-system, the busy time 354 may also be referred to as normal mode. The horizontal axis generally represents the passage of time. The bottom row 350 represents individual memory operations (e.g., accesses such as reads and writes) as indicated by the arrows. Note that the arrows are aligned with the busy time 354 and the pre-shutdown mode 358, but not with the shutdown mode 360.

In contrast to the mobile device, when the vehicle is on, the memory sub-system is operating most or all of the time because the dashboard/infotainment system may be running, the telemetry system may be running, and the black box system may be running. The memory sub-system is therefore being accessed frequently. When the vehicle is turned on it can enter a normal mode. Before the vehicle is turned off, the memory sub-system can enter a pre-shutdown mode 358 during which user interactions and systems such as infotainment, telemetry, and black box may be suspended or prohibited, thereby reducing or eliminating accesses to the memory sub-system. Accordingly, in the pre-shutdown mode 358, the memory sub-system can perform media management operations as indicated by the arrows in the second row 350 underlying the pre-shutdown mode 358. Other idle jobs of the memory sub-system can be executed while in the pre-shutdown mode as well. The pre-shutdown mode forces what would otherwise be referred to as idle time to occur for the memory sub-system and during which media management operations can be performed. When the media management operations are complete, the vehicle memory sub-system can store a value in a status register indicating that the operations are complete. In some embodiments, the host can read the status register, discover that the operations are complete, and then send a shutdown command. In some embodiments, the vehicle memory sub-system can shut down without further instruction from the host.

When the memory sub-system is in shutdown mode, it can be completely powered down or in a low-power standby state. While in the shutdown mode, the memory sub-system does not perform any memory operations or media management operations. While in the shutdown mode, the memory sub-system can respond to commands such as restart or power-up commands, to change a mode of the memory sub-system to enable further operations thereof.

Although not specifically illustrated in FIG. 3B, the vehicle memory sub-system can transition from pre-shutdown mode 358 to normal mode 354 in response to a restart command from the host (e.g., if a user restarts the vehicle before the media management operation is complete). In such an instance, the vehicle memory sub-system can exit or abort the media management operation and return to the normal mode 354 allowing the user interface to function and/or allowing applications such as infotainment, telemetry, and black box to resume operation.

Figure 4:
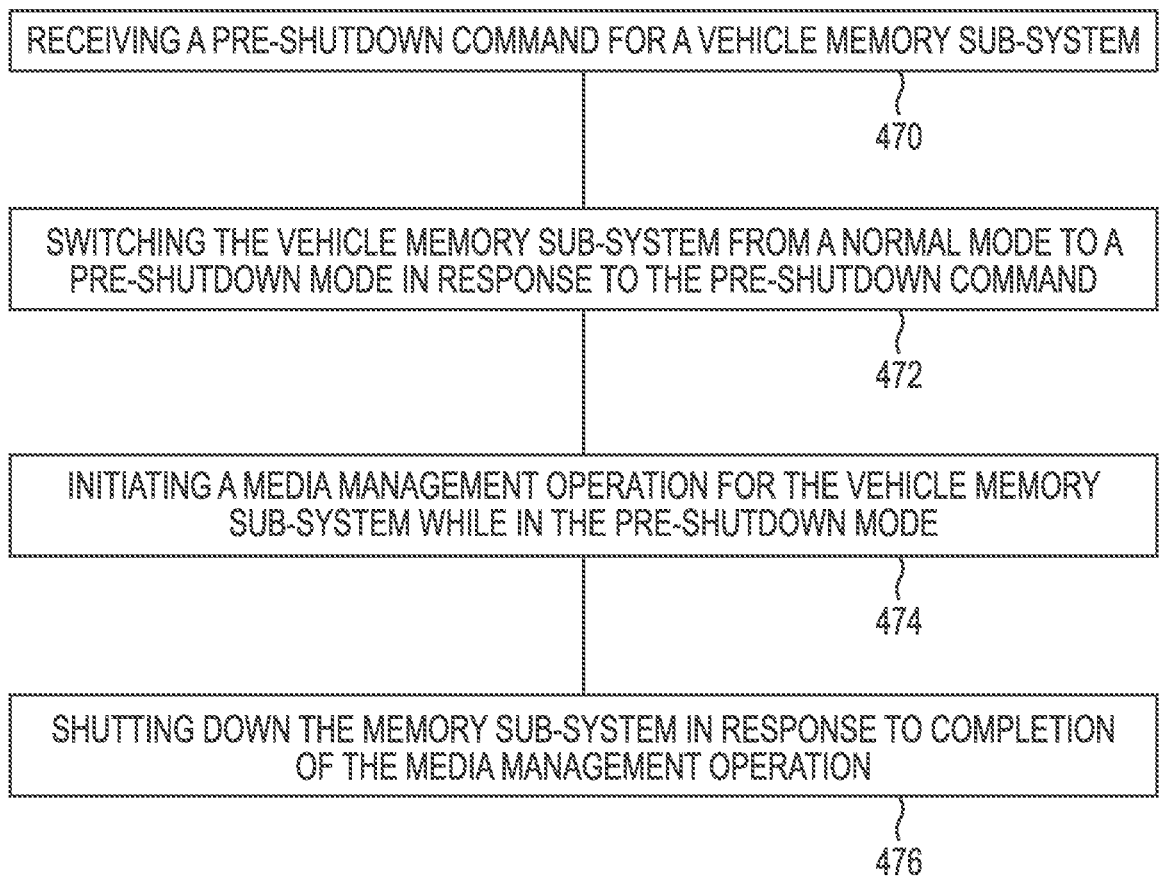
FIG. 4 is a flow diagram of an example method for operating a memory sub-system accordance with some embodiments of the present disclosure.

FIG. 4 is a flow diagram of an example method for operating a memory sub-system accordance with some embodiments of the present disclosure. The method can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by or using the host 102, memory sub-system controller 114, processing device 110-2, status/mode circuitry 124, non-volatile memory device 120 and/or volatile memory device 118, and/or local media controller 122 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 470 in the example method of FIG. 4, a pre-shutdown command for a vehicle memory sub-system can be received (e.g., from a host). At block 472 in the example method of FIG. 4, the vehicle memory sub-system can be switched from a normal mode to a pre-shutdown mode in response to the pre-shutdown command. The pre-shutdown mode may also be referred to in the art as garage mode. The pre-shutdown mode includes idle time prior to system shutdown when users do not interact with system and/or when data from the system sensors (e.g., sensors 232 illustrated in FIG. 2) is no longer being received or recorded. While in the pre-shutdown mode, the system can remain powered on, but a screen and/or user interface (e.g., an infotainment system) can be powered off and/or disabled. In at least one embodiment, media management operations can be prohibited while in the normal mode so that the memory sub-system can be responsive to user inputs, ready to write sensor data, ready to receive, process, and display telemetry data, etc. without having to interrupt a media management operation to do so.

At block 474 in the example method of FIG. 4, a media management operation can be initiated for the vehicle memory sub-system while in the pre-shutdown mode. The lack of user inputs and/or sensor data causing accesses to the memory sub-system allows it to perform the media management operations without what would otherwise be interruptions as described above with respect to FIG. 3. In some embodiments, one media management operation is performed while in the pre-shutdown mode. In some embodiment, more than one, or all media management operations that the memory sub-system is configured to perform are performed while in the pre-shutdown mode.

One example of a media management operation is a volume read refresh operation for data stored in the vehicle memory sub-system. The volume read refresh operation can include refreshing any data in the memory sub-system (e.g., for the entire volume). Conversely, a block read refresh operation can be performed on a particular block of data (e.g., in response to a read error). Block read refresh operations can be performed while the vehicle memory sub-system is in a normal mode. For embodiments in which media management operations are prohibited in the normal mode, block read refresh operations can still be permitted due to their more limited affect on operation of the memory sub-system than volume read refresh operations. Read refresh operations can provide better data retention and reliability.

Another example of a media management operation is a static wear leveling operation. Static wear leveling can be prohibited while in the normal mode (e.g., to prevent an increase in latency associated with performing the static wear leveling while in the normal mode), however dynamic wear leveling can be permitted while in the normal mode. Dynamic wear leveling uses a map to link logical block addresses to physical memory addresses so that erasures and writes are distributed more evenly across the blocks of memory in the memory sub-system. Specifically, when data is written to the memory sub-system, it can be written to a block of memory having a lowest erase count or a block of memory having an erase count below a threshold value. The threshold value can be change as the memory sub-system ages (e.g., as the average erase count for the blocks of memory in the memory sub-system increases, the threshold erase count for new writes can increase). Static wear leveling includes moving data that does not tend to change very often so that the blocks of memory that store that data can be used to store data that is changed more frequently, thus providing a more levelized count of program/erase cycles for the blocks of memory in the memory sub-system. One example of a static wear leveling operation includes moving data from a block of memory with a low erase count to a block with a high erase count and moving data from the block of memory with the high erase count to the block of memory with the low erase count. Dynamic wear leveling is typically associated with a write or erase operation initiated by a host, whereas static wear leveling is not. Wear leveling can promote efficient distribution of data across the blocks of memory and improved endurance for the memory.

Another example of a media management operation is a defragmentation operation. When in the pre-shutdown mode, a defragmentation operation can be initiated regardless of a ratio of free blocks of memory available to used blocks of memory. When in the normal mode, a defragmentation operation can be initiated only in response to the ratio being less than a threshold. The threshold can be user-defined or system-defined (e.g., by a manufacturer of the memory sub-system). The defragmentation operation can include scanning used blocks of memory to determine how much of the data stored therein is valid versus stale and then move the valid data to a new block of memory with valid data from other used blocks of memory, and erasing the used blocks of memory, which results in more free blocks of memory for the memory sub-system. The defragmentation operation can also improve later write performance for the memory sub-system.

At block 476 in the example method of FIG. 4, the memory sub-system can be shut down in response to completion of the media management operation. In some embodiments, the memory sub-system is prevented from shutting down until the media management operation is completed. Although not specifically illustrated, the method can include receiving a restart command for the vehicle memory sub-system after receiving the pre-shutdown command and before completion of the media management operation. In response to receiving the restart command, the media management operation can be exited (e.g., aborted) in order to facilitate restarting the vehicle and returning the vehicle memory sub-system to the normal mode. The vehicle memory sub-system can be switched from the pre-shutdown mode to the normal mode in response to the restart command and/or in response to exiting the media management operation. Although not specifically illustrated, the method can include receiving a data access command for the vehicle memory sub-system after receiving the pre-shutdown command and before completion of the media management operation. The media management operation can be exited in response to receiving the data access command. While in the shutdown mode, the memory sub-system does not respond to media access requests or perform media management operations. In order to respond to such requests or perform operations, the memory sub-system would change modes (e.g., to a normal mode in response to a request from a host to do so).

Figure 5:
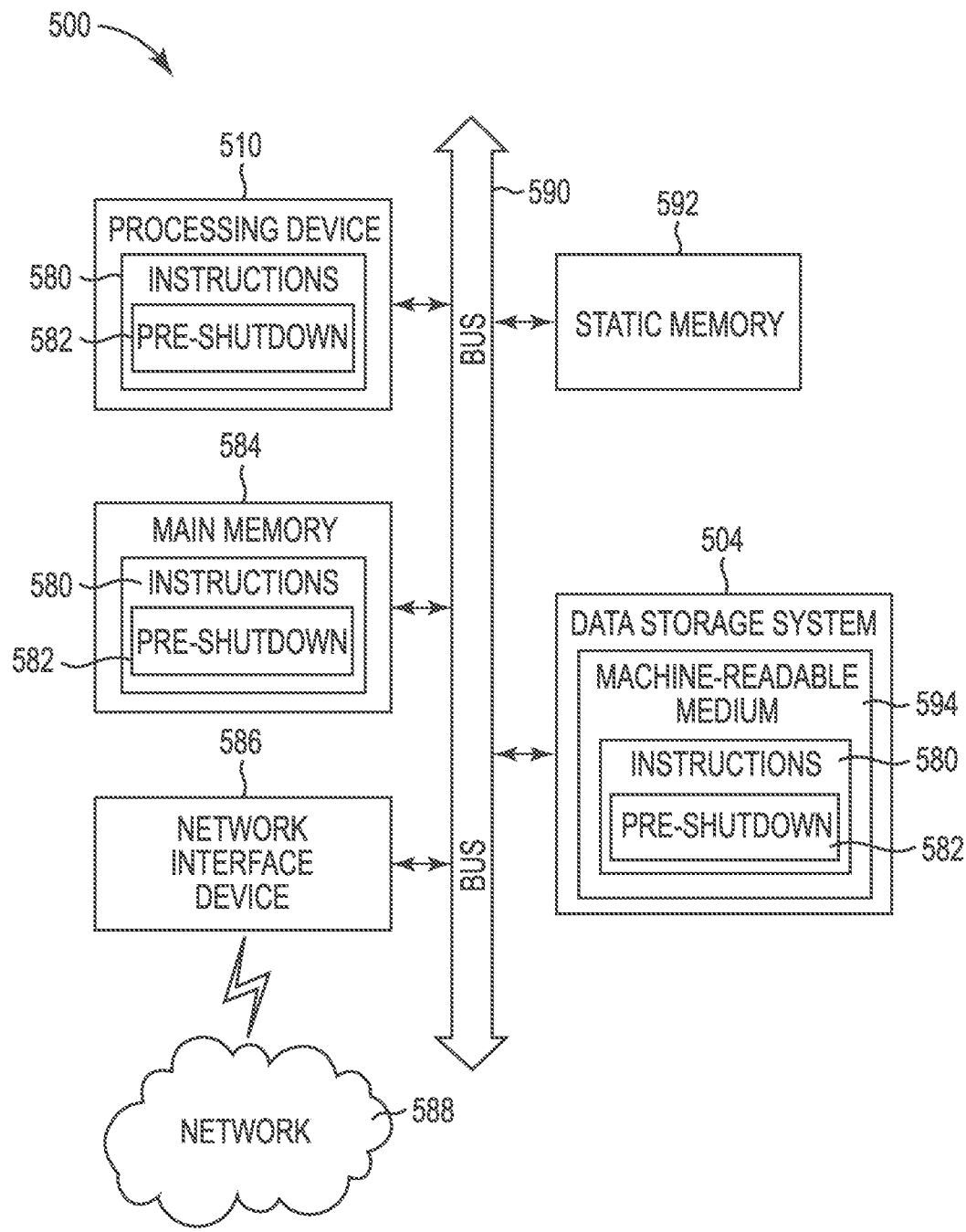
FIG. 5 is a block diagram of an example computer system in which embodiments of the present disclosure may operate.

FIG. 5 is a block diagram of an example computer system in which embodiments of the present disclosure may operate. Within the computing system 500, a set of instructions, for causing a machine to perform one or more of the methodologies discussed herein, can be executed. The computing system 500 includes a processing device 510, a main memory 584, a static memory 592 (e.g., flash memory, static random access memory (SRAM), etc.), and a data storage system 504, which communicate with each other via a bus 590. The data storage system 504 is analogous to the memory sub-system 104 illustrated in FIG. 1.

The processing device 510 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 510 can also be one or more special-purpose processing devices such as an ASIC, an FPGA, a digital signal processor (DSP), network processor, or the like. The processing device 510 is configured to execute instructions 580 for performing the operations and steps discussed herein. The computing system 500 can further include a network interface device 586 to communicate over a network 588.

The data storage system 504 can include a machine-readable storage medium 594 (also known as a computer-readable medium) on which is stored one or more sets of instructions 580 or software embodying one or more of the methodologies or functions described herein. The instructions 580 can also reside, completely or at least partially, within the main memory 584 and/or within the processing device 510 during execution thereof by the computing system 500, the main memory 584 and the processing device 510 also constituting machine-readable storage media.

In one embodiment, the instructions 580 include instructions to implement functionality corresponding to the status/mode circuitry 124 of FIG. 1. For example, the instructions can include pre-shutdown 582 instructions to initiate a media management operation for the data storage system 504 in response to receiving a pre-shutdown command for the vehicle. While the machine-readable storage medium 594 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a machine-readable storage medium, such as, but not limited to, types of disks, semiconductor-based memory, magnetic or optical cards, or other types of media suitable for storing electronic instructions.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a pre-shutdown command for a vehicle memory sub-system;
switching the vehicle memory sub-system from a normal mode to a pre-shutdown mode in response to the pre-shutdown command;
initiating a media management operation for the vehicle memory sub-system while in the pre-shutdown mode; and
shutting down the memory sub-system in response to completion of the media management operation.

2. The method of claim 1, further comprising prohibiting at least one media management operation for the vehicle memory sub-system while in the normal mode.

3. The method of claim 1, wherein initiating the media management operation comprises initiating a volume read refresh operation for data stored in the vehicle memory subsystem; and
 wherein the method further comprises initiating a block read refresh operation for data stored in the vehicle memory subsystem while in the normal mode only in response to a read error.

4. The method of claim 1, wherein initiating the media management operation comprises initiating a static wear leveling operation; and
 wherein the method further comprises:
  prohibiting static wear leveling while in the normal mode; and
  initiating dynamic wear leveling while in the normal mode.

5. The method of claim 1, wherein initiating the media management operation comprises initiating a defragmentation operation regardless of a ratio of free blocks of memory available to used blocks of memory; and
 wherein the method further comprises initiating the defragmentation while in the normal mode only in response to the ratio being less than a threshold.

6. The method of claim 1, further comprising:
 receiving a restart command for the vehicle memory sub-system after receiving the pre-shutdown command and before completion of the media management operation; and
 exiting the media management operation in response to the restart command.

7. The method of claim 6, further comprising switching the vehicle memory sub-system from the pre-shutdown mode to the normal mode in response to the restart command.

8. The method of claim 1, further comprising:
 receiving a data access command for the vehicle memory sub-system after receiving the pre-shutdown command and before completion of the media management operation; and
 exiting the media management operation in response to the data access command.

9. The method of claim 1, further comprising disabling a user interface in response to switching to the pre-shutdown mode.

10. An apparatus, comprising:
 a host interface;
 a controller including a status register readable via the host interface;
 a memory device coupled to the controller;
 wherein the controller is configured to:
  receive a pre-shutdown command from the host interface;
  change the status register from a first status to a second status in response to the pre-shutdown command;
  initiate a media management operation for the memory device in response to the pre-shutdown command; and
  change the status register from the second status to a third status in response to completion of the media management operation.

11. The apparatus of claim 10, wherein the apparatus comprises an automotive grade solid state drive;
 wherein the first status indicates a normal mode;
 wherein the second status indicates that the media management operation is pending; and
 wherein the third status indicates that the media management operation is complete.

12. The apparatus of claim 11, wherein the controller is further configured to receive an startup command via the host interface; and
 wherein the controller is configured to interrupt the media management operation in response to receiving the startup command and in response to the status register having the second status.

13. The apparatus of claim 12, wherein the controller is further configured to provide an indication of the third status via the host interface in response to the change from the second status to the third status.

14. The apparatus of claim 10, wherein the controller is further configured to change from a normal mode to a pre-shutdown mode in response to the pre-shutdown command.

15. The apparatus of claim 14, wherein the media management operation includes at least one of a group of media management operations including:
 a volume read refresh operation;
 a defragmentation operation; and
 a static wear leveling operation.

16. The apparatus of claim 15, wherein the controller is further configured to, when in the normal mode:
 perform a block read refresh operation;
 perform a defragmentation operation only in response to less than a threshold of free blocks being available; and
 perform dynamic wear leveling.

17. A non-transitory machine readable medium storing instructions executable to:
 run a black box application for a vehicle;
 run an infotainment application for the vehicle;
 run a telemetry application for the vehicle;
 use a memory sub-system to provide storage for the black box, infotainment, and telemetry applications;
 initiate a media management operation for the memory sub-system in response to receiving a pre-shutdown command for the vehicle; and
 exit the media management operation in response to receiving a restart command for the vehicle prior to completion of the media management operation.

18. The medium of claim 17, further storing instructions to virtualize the black box, infotainment, and telemetry applications into a single system with backing storage provided by the memory sub-system.

19. The medium of claim 17, further storing instructions to provide a shutdown ready notification in response to completion of the media management operation.

20. The medium of claim 17, wherein the instructions to initiate the media management operation comprise instructions to initiate at least one of a first group of media management operations including:
 a volume read refresh operation;
 a defragmentation operation; and
 a static wear leveling operation; and
 further storing instructions only to initiate any of the first group of media management operations in response to receiving a pre-shutdown command.

21. The medium of claim 20, further storing instructions to initiate at least one of a second group of media management operations including:
 a block read refresh operation;
 a defragmentation operation only in response to less than a threshold of free blocks being available; and
 a dynamic wear leveling operation;

after receiving a startup command for the vehicle and before receiving the pre-shutdown command.

\* \* \* \* \*